(12) United States Patent
Sharifi et al.

(10) Patent No.: US 11,308,934 B2
(45) Date of Patent: Apr. 19, 2022

(54) HOTWORD-AWARE SPEECH SYNTHESIS

(71) Applicant: Google LLC, Mountain View, CA (US)

(72) Inventors: Matthew Sharifi, Kilchberg (CH); Aleksandar Kracun, New York, NY (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/609,326

(22) PCT Filed: Jun. 25, 2018

(86) PCT No.: PCT/US2018/039348
§ 371 (c)(1),
(2) Date: Oct. 29, 2019

(87) PCT Pub. No.: WO2020/005202
PCT Pub. Date: Jan. 2, 2020

(65) Prior Publication Data
US 2021/0104221 A1  Apr. 8, 2021

(51) Int. Cl.
G10L 13/027 (2013.01)
G06K 9/62 (2006.01)
G10L 13/08 (2013.01)
G10L 17/24 (2013.01)
G10L 25/87 (2013.01)

(52) U.S. Cl.
CPC .......... G10L 13/027 (2013.01); G06K 9/6262 (2013.01); G10L 13/086 (2013.01); G10L 17/24 (2013.01); G10L 25/87 (2013.01)

(58) Field of Classification Search
CPC ..... G10L 13/027; G10L 13/086; G10L 17/24; G10L 25/87; G10L 21/00; G10L 13/08; G06K 9/6262
See application file for complete search history.

(56) References Cited

U.S. PATENT DOCUMENTS 9,443,517 B1 * 9/2016 Foerster .................. G10L 25/30
9,548,053 B1 * 1/2017 Basye .................... G06F 16/683
(Continued)

OTHER PUBLICATIONS

International Search Report and Written Opinion for the related PCT application No. PCT/US2018/039348 dated Mar. 26, 2019.

Primary Examiner — Pierre Louis Desir
Assistant Examiner — Nicole A K Schmieder
(74) Attorney, Agent, or Firm — Honigman LLP; Brett A. Krueger

(57) ABSTRACT

A method includes receiving text input data for conversion into synthesized speech and determining, using a hotword-aware model trained to detect a presence of a hotword assigned to a user device, whether a pronunciation of the text input data includes the hotword. The hotword is configured to initiate a wake-up process on the user device for processing the hotword and/or one or more other terms following the hotword in the audio input data. When the pronunciation of the text input data includes the hotword, the method also includes generating an audio output signal from the text input data and providing the audio output signal to an audio output device to output the audio output signal. The audio output signal when captured by an audio capture device of the user device, configured to prevent initiation of the wake-up process on the user device.

18 Claims, 7 Drawing Sheets

(56) References Cited

U.S. PATENT DOCUMENTS

| | | | |
|---|---|---|---|
| 9,865,253 B1* | 1/2018 | De Leon | G10L 17/02 |
| 10,152,966 B1* | 12/2018 | O'Malley | H04M 1/72484 |
| 10,186,265 B1* | 1/2019 | Lockhart | G10L 15/32 |
| 10,453,460 B1* | 10/2019 | Wightman | G06F 16/316 |
| 10,580,405 B1* | 3/2020 | Wang | G10L 17/22 |
| 10,649,727 B1* | 5/2020 | Douglas | G06F 3/167 |
| 2015/0088509 A1* | 3/2015 | Gimenez | G10L 17/22 |
| | | | 704/243 |
| 2017/0110144 A1* | 4/2017 | Sharifi | G06F 21/32 |
| 2017/0200451 A1* | 7/2017 | Booklet | G10L 17/02 |
| 2017/0257712 A1* | 9/2017 | Porsbo | H04R 25/30 |
| 2018/0130469 A1 | 5/2018 | Gruenstein et al. | |
| 2019/0043492 A1* | 2/2019 | Lang | G06F 3/165 |
| 2019/0149987 A1* | 5/2019 | Moore | G06F 3/167 |
| | | | 726/9 |

\* cited by examiner

HOTWORD-AWARE SPEECH SYNTHESIS

TECHNICAL FIELD

This disclosure relates to hotword-aware speech synthesis.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once the device has awoken by the hotword within the detected utterance, the device performs further processing on the hotword and/or one or more terms that follow the hotword. In other words, the hotword and/or one or more terms form a query or a voice command to be performed by the device. As speech synthesizers become more prevalent within speech-enabled environments, a synthesized utterance containing a hotword, or including other words/sub-words that sound like the hotword, may cause the device to wake-up from the sleep/hibernation state and begin processing the synthesized utterance even though the synthesized utterance is not directed to that device. Stated another way, the synthesized speech unintentionally activates the device, often to the dismay of a user of a speech synthesizer. Consequently, a system that receives utterances within the environment must have some way of discerning between an utterance of human speech directed at the system and an utterance of synthesized speech output from a nearby device not directed at the system.

SUMMARY

A method for preventing initiation of a wake-up process on a user device. The method includes receiving, at data processing hardware of a speech synthesis device, text input data for conversion into synthesized speech; and determining, by the data processing hardware and using a hotword-aware model trained to detect a presence of at least one hotword assigned to a user device, whether a pronunciation of the text input data includes the hotword, the hotword, when included in audio input data received by the user device, configured to initiate a wake-up process on the user device for processing the hotword and/or one or more other terms following the hotword in the audio input data. When the pronunciation of the text input data includes the hotword, the method also includes generating an audio output signal from the text input data and providing, by the data processing hardware, the audio output signal to an audio output device to output the audio output signal. The audio output signal when captured by an audio capture device of the user device, configured to prevent initiation of the wake-up process on the user device.

Implementations of the disclosure may include one or more of the following optional features. In some implementations, determining whether the pronunciation of the text input data includes the hotword includes determining that of at least one of a word, a sub-word, or a text-to-speech sequence of the text input data is associated with the hotword. The hotword-aware model may be trained on a text-to-speech sequence or audio representation of the hotword assigned to the user device. Additionally, the text input data may include a first language and the audio output signal may include a translation of the text input data in a different language.

In some examples, the method also includes detecting, by the data processing hardware, a presence of the user device within an operating environment of the speech synthesis device; and querying, by the data processing hardware, the user device to obtain the hotword assigned to the user device for training the hotword-aware model. Additionally or alternatively, the method may include querying a remote hotword repository to obtain at least the hotword assigned to the user device for training the hotword-aware model.

In some implementations, generating the audio output signal from the text input data includes inserting a watermark to the audio output signal that indicates the audio output signal corresponds to synthesized speech and instructs a hotword detector of the user device to ignore detection of the hotword in the synthesized speech. In other implementations, generating the audio data includes determining a speech waveform that represents a text-to-speech output for the text input data and altering the speech waveform by removing or altering any sounds associated with the hotword to evade detection of the hotword by a hotword detector of the user device. In yet another implementations, generating the audio data includes determining a speech waveform that represents the text input data and filtering the audio waveform to evade detection of the hotword by a hotword detector of the user device.

Another aspect of the present disclosure provides a method for preventing initiation of a wake-up process on a user device. The method includes receiving, at a hotword detector of a user device, audio input data containing a hotword, the hotword configured to initiate a wake-up process on the user device for processing the hotword and/or one or more other terms following the hotword in the audio input data; determining, by the hotword detector, whether the audio input data includes synthesized speech using a hotword detector model configured to detect the hotword in the audio input data and a presence of synthesized speech; and when the audio input data comprises synthesized speech, preventing, by the hotword detector, initiation of the wake-up process on the user device for processing the hotword and/or the one or more other terms following the hotword in the audio input data.

This aspect may include one or more of the following optional features. In some implementations, the hotword detector model is trained on a plurality of training samples that include positive training samples and negative training samples. The positive training samples include human-generated audio data corresponding to one or more users speaking the hotword assigned to the user device. The negative training samples include synthesized speech utterances output from one or more speech synthesizer devices. In some examples, at least one of the synthesized speech utterances of the negative training samples pronounce the hotword assigned to the user device. In other examples, None of the synthesized speech utterances of the negative training samples pronounce the hotword assigned to the user device. Determining whether the audio input data includes synthesized speech may include using the hotword detector model to detect the presence of synthesized speech in the audio input data through an analysis of acoustic features of the audio input data without transcribing or semantically interpreting the audio input data.

Another aspect of the present disclosure provides a system for preventing initiation of a wake-up process on a user device. The system includes data processing hardware of a speech synthesis device and memory hardware in communication with the data processing hardware. The memory hardware storing instructions that when executed by the data processing hardware cause the data processing hardware to perform operations that include receiving text input data for conversion into synthesized speech and determining, using a hotword-aware model trained to detect a presence of at least one hotword assigned to a user device, whether a pronunciation of the text input data includes the hotword. The hotword when included in audio input data received by the user device, configured to initiate a wake-up process on the user device for processing the hotword and/or one or more other terms following the hotword in the audio input data. When the pronunciation of the text input data includes the hotword, the operations also include generating an audio output signal from the text input data and providing the audio output signal to an audio output device to output the audio output signal. The audio output signal when captured by an audio capture device of the user device, configured to prevent initiation of the wake-up process on the user device.

Implementations of the disclosure may include one or more of the following optional features. In some implementations, determining whether the pronunciation of the text input data includes the hotword includes determining that of at least one of a word, a sub-word, or a text-to-speech sequence of the text input data is associated with the hotword. The hotword-aware model may be trained on a text-to-speech sequence or audio representation of the hotword assigned to the user device. Additionally, the text input data may include a first language and the audio output signal may include a translation of the text input data in a different language.

In some examples, the operations also include detecting a presence of the user device within an operating environment of the speech synthesis device and querying the user device to obtain the hotword assigned to the user device for training the hotword-aware model. Additionally or alternatively, the operations may also include querying a remote hotword repository to obtain at least the hotword assigned to the user device for training the hotword-aware model.

In some implementations, generating the audio output signal from the text input data includes inserting a watermark to the audio output signal that indicates the audio output signal corresponds to synthesized speech and instructs a hotword detector of the user device to ignore detection of the hotword in the synthesized speech. In other implementations, generating the audio data includes determining a speech waveform that represents a text-to-speech output for the text input data and altering the speech waveform by removing or altering any sounds associated with the hotword to evade detection of the hotword by a hotword detector of the user device. In yet another implementations, generating the audio data includes determining a speech waveform that represents the text input data and filtering the audio waveform to evade detection of the hotword by a hotword detector of the user device.

Another aspect of the present disclosure provides a system for preventing initiation of a wake-up process on a user device. The system includes data processing hardware of a user device and memory hardware in communication with the data processing hardware. The memory hardware storing instructions that when executed by the data processing hardware cause the data processing hardware to perform operations that include receiving, at a hotword detector of a user device, audio input data containing a hotword, the hotword configured to initiate a wake-up process on the user device for processing the hotword and/or one or more other terms following the hotword in the audio input data; determining, by the hotword detector, whether the audio input data includes synthesized speech using a hotword detector model configured to detect the hotword in the audio input data and a presence of synthesized speech; and when the audio input data comprises synthesized speech, preventing, by the hotword detector, initiation of the wake-up process on the user device for processing the hotword and/or the one or more other terms following the hotword in the audio input data.

This aspect may include one or more of the following optional features. In some implementations, the hotword detector model is trained on a plurality of training samples that include positive training samples and negative training samples. The positive training samples include human-generated audio data corresponding to one or more users speaking the hotword assigned to the user device. The negative training samples include synthesized speech utterances output from one or more speech synthesizer devices. In some examples, at least one of the synthesized speech utterances of the negative training samples pronounce the hotword assigned to the user device. In other examples, None of the synthesized speech utterances of the negative training samples pronounce the hotword assigned to the user device. Determining whether the audio input data includes synthesized speech may include using the hotword detector model to detect the presence of synthesized speech in the audio input data through an analysis of acoustic features of the audio input data without transcribing or semantically interpreting the audio input data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
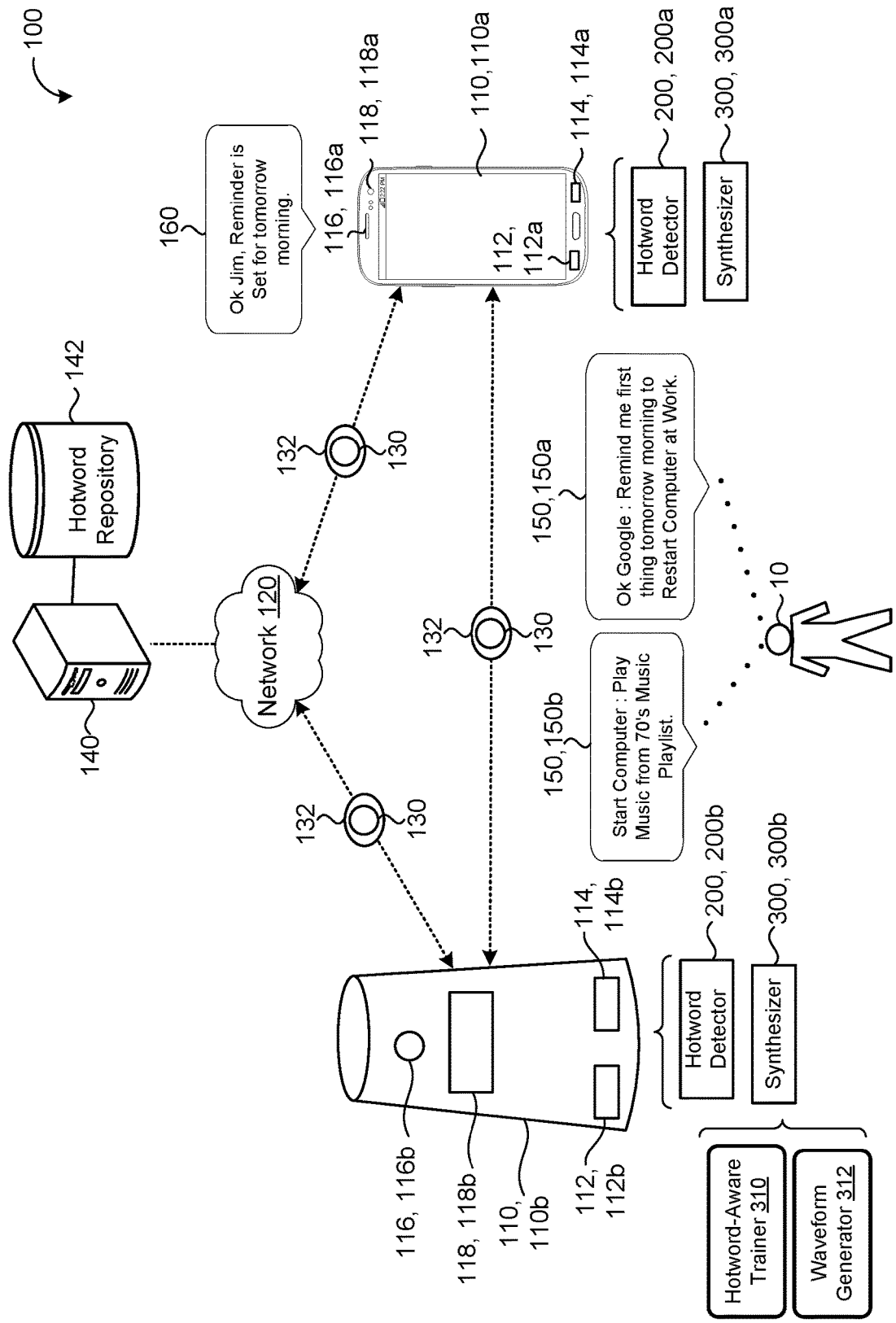
FIG. 1 is a schematic view of an example speech-enabled environment.

In a speech-enabled environment, a user's manner of interacting with a computer-based system, that may be implemented using a network of connected microphone devices distributed throughout the environment (e.g., rooms or other areas of a home, workplace, school, etc.), is designed to be primarily, if not exclusively, through voice input (i.e., audio commands). More devices are using audio commands to instruct operation of user devices. Through the use of a "hotword" (also referred to as an "attention word", "wake-up phrase/word", "trigger phrase", or "voice action initiation command"), in which by agreement a predetermined term (i.e., keyword) that is spoken to invoke the attention of the system is reserved, the system is able to discern between utterances directed to the system (i.e., to initiate a wake-up process for processing one or more terms following the hotword in the utterance) and utterances directed to an individual in the environment. To put another way, a user device may operate in a low power mode, but upon detecting a hotword, the user device may switch into a full power mode so that all audio data captured by a microphone is detected, processed, and analyzed. However, as the output of synthesized speech from speech synthesizers (e.g., text-to-speech (TTS) systems) becomes more prevalent within speech-enabled environments, synthesized speech including a hotword assigned to a nearby user device, or words or sub-words that make up or sound like the hotword, can unintentionally cause a hotword detector (e.g., hotworder) on the user device to detect the presence of the hotword and initiate the wake-up process for processing terms in the synthesized speech. As used herein, the terms "synthesized speech" and "synthesized utterance" are used interchangeably. As used herein, synthesized speech output from a TTS system or speech synthesis device includes a machine output from a non-audible originating data input. The machine output can inform a user of operations being performed by a device associated with the TTS system or to acknowledge instructions provided by the user to the device associated with the TTS system. Accordingly, synthesized speech is distinguishable from broadcasted audio output from a television, multimedia set-top box, stereo, radio, computer system, or other type of device capable of outputting broadcasted audio.

For instance, in a speech-enabled environment, such as a home of a user, the user may have one or more mobile devices (e.g., smart phone and/or tablet) and a smart speaker/display device. The smart speaker/display device may operate as a digital assistant for outputting synthesized speech as well as triggering processing of a voice query or a voice command to be performed when the voice query or the voice command is preceded by a hotword assigned to the corresponding user device. Scenarios may occur when synthesized speech output from one of the devices (e.g., the smart speaker) that is directed toward the user contains one or more words or sub-words that make up a hotword assigned to one of the other devices (e.g., the user's tablet) in the environment. For example, the term "Dog" may be assigned as a hotword to the user's tablet and a portion of the synthesized speech may recite the term "hotdog." As a result, a microphone of the other device may capture the synthesized speech and a hotword detector may detect the term "dog" preceded by the term "hot" and trigger the user's tablet to unintentionally initiate the wake-up process. Thus, pronunciation of the hotword in the synthesized speech may unintentionally cause a nearby speech-enabled device to transition from a sleep/hibernation state to an active state where the nearby speech-enabled device begins processing (i.e., transcribing and/or semantically interpreting) the synthesized speech.

It is an object of the present disclosure to avoid initiation of the wake-up process of one or more other user devices caused by the use of a hotword, or other term that sounds like the hotword, generated by TTS audio (e.g., synthesized speech). This will prevent unintended initiation of the wake-up process, thereby allowing user devices to remain in a lower power state for longer to conserve power.

In order to prevent unintentional initiation of the wake-up process in response to detecting pronunciation of a hotword in a synthesized utterance, implementations herein are directed toward injecting hotwords assigned to nearby devices into a training pipeline of a TTS system to generate a hotword-aware model for use in detecting a presence of the hotwords. The hotword-aware model may be trained on any combination of hotwords assigned to nearby devices, a list of hotwords associated with one or more devices owned-controlled by a specific user, and/or a list of all potential hotwords that may be assigned to any given device for initiating the wake-up process. For instance, a speech synthesizer device may use the hotword-aware model to determine whether a pronunciation of text input data for conversion into synthesized speech includes the hotword. In some examples, the hotword-aware model is trained on an audio representation (e.g., acoustic features) of the hotword such as a sequence or string of the hotword. Accordingly, a speech synthesis device that receives text input data (text and content) for conversion into synthesized speech may pre-process the text input data to obtain individual sequences (TTS sequences) and use the hotword-aware model to recognize sequences that, when pronounced audibly, compose the hotword or compose sound-alike phrases of the hotword by identifying matches or similarities between the TTS sequences and a hotword sequence obtained from the hotword-aware model. For instance, text input data that includes the phrase "dawg" would compose a sound-alike phrase of a hotword for the term "dog" when pronounced audibly. Accordingly, the hotword-aware model is trained to detect whether a pronunciation of text input data includes the hotword (e.g., composes the hotword or composes sound-alike phrases of the hotword). The TTS system may include a multi-lingual TTS system trained on multiple languages such that the hotword aware model is trained to detect the hotword or sound-alike phrases of the hotword in multiple languages.

If the speech synthesis device simply held a log or a whitelist of known hotwords in text form, as opposed to using the hotword-aware model, the speech synthesis device would fail to recognize misspelled words in the text input data that compose the hotword and fail to recognize sub-words within a word that compose the hotword. For instance, if the speech synthesis device simply referenced a whitelist of known hotwords, the speech synthesis device would fail to recognize text input data for the phrase "dawg" composing a hotword for the term "dog" (unless the spelling of "dawg" were included in the whitelist) and would fail to recognize the sub-word "dog" in text input data for the phrase "hotdog" (unless "hotdog" was included in the whitelist).

Once the speech synthesis device determines that a pronunciation of text input data includes the hotword, implementations further include a waveform generator of the speech synthesis device generating an audio output signal for the synthesized speech that is configured to prevent initiation of a wake-up process on a nearby user device when the audio output signal is captured by a microphone of the nearby user device. In some examples, the waveform generator uses unit selection logic for generating the output audio signal. In these examples, the waveform generator may emit a known watermark over the audio sequence where the known watermark is identifiable to a hotword detector on the nearby user device; thus, the hotword detector on the nearby user device would simply ignore the audio output signal with the known watermark even though the audio output signal pronounces the hotword. Alternatively, the unit selection logic may select an alternative variation of units (or a subset of the units) used to generate the synthesized speech (e.g., audio output signal) that are known to be adversarial to a hotword detection model used by the hotword detector of the nearby user device. Here, the hotword detection model may be trained on these same adversarial units so that the hotword detector knows to ignore any utterances including these units during inference (i.e. a non-training mode of the hotword detector), and thereby prevent initiation of the wake-up process even when the utterance contains a hotword. Moreover, the waveform generator could distort the synthesized speech using a filter trained against the hotword detector of the nearby user device so that the hotword detector ignores or fails to detect the synthesized speech.

In other examples, the waveform generator may generate the output audio signal by using a neural network (e.g., based on WaveNet) to output an audio sequence of synthesized phonemes that represent the text input data. In these examples, when a portion of the synthesized phonemes forms the hotword, the waveform generator may provide additional conditioning information that causes the neural network to emit a known watermark over the audio sequence that would be identifiable to a hotword detector on the nearby user device so that the nearby user device would simply ignore the audio output signal even though the hotword is pronounced. In other words, the presence of a watermark is used to instruct the nearby user device to ignore the pronounced hotword. Alternatively, segments of synthesized speech output from the neural network that compose the hotword (or compose sound-alike phrases of the hotword) may be modified (e.g., distorted) to generate the output audio signal in a manner that is adversarial to detection by the hotword detector of the nearby user device.

Additionally or alternatively, implementations may further include injecting synthesized speech utterances into a training pipeline of a hotword detector to generate a hotword detector model. The hotword detector model is configured to detect a presence of synthesized speech in audio input data received by the hotword detector. For instance, a hotword detector trainer may train the hotword detector to detect hotwords in utterances and to further determine whether or not an utterance includes synthesized speech, e.g., audio data output from a speech synthesis device (e.g., TTS system). Thus, when a microphone on a user device captures an utterance that contains a hotword assigned to the user device, the hotword detector will simply ignore the presence of the hotword in the captured utterance if the hotword detector detects that the utterance includes synthesized speech, thereby preventing initiation of the wake-up process on the user device. In some examples, the hotword detector model is trained on positive training examples that include human-generated audio data corresponding to one or more users speaking the hotword assigned to the user device, and negative training samples including synthesized speech utterances output from one or more speech synthesizer devices. By training the hotword detector model to detect the presence of synthesized speech in audio input data, the hotword detector may advantageously use the hotword detector model to detect the presence of synthesized speech through an analysis of acoustic features of received audio input data without transcribing or semantically interpreting the audio input data.

Referring to FIG. 1, in some implementations, a speech-enabled system 100 includes one or more user devices 110, 110a-b. For example, the speech-enabled system 100 includes two user devices 110a, 110b located proximate to one another and connected to a remote server 140 (e.g., cloud computing environment) via a network 130. The user devices 110a, 110b may or may not communicate with one another. Each user device 110 is configured to capture sounds corresponding to an utterance 150 from a user 10. The user 10 may speak the utterance 150 out loud as a query or a command. The speech-enabled system 100 may field the query or the command by answering the query and/or causing the command to be performed. Each user device 110 includes data processing hardware 112 and memory hardware 114 in communication with the data processing hardware 112 and storing instructions, that when executed by the data processing hardware 112, cause the data processing hardware 112 to perform one or more operations. Each user device 110 further includes an audio capture device (e.g., microphone) 116 for capturing and converting spoken utterances 150 within the speech-enabled system 100 into electrical signals and a speech output device (e.g., a speaker) 118 for communicating an audible audio signal (e.g., as output audio data from a user device 110).

Each user device 110 may be associated with the user 10 and capable of processing the utterance 150 from the associated user 10 when the utterance 150 begins with a hotword 130. A hotword 130 may be a spoken phrase that causes either of the user devices 110 to treat a subsequently spoken phase as a voice input for the system. In other words, a hotword 130 may be a spoken phrase that explicitly indicates that a spoken input is to be treated as a voice command. Namely, a hotword 130 may be a spoken phrase that triggers endpointing, automated speech recognition, or semantic interpretation on the hotword 130 or one or more terms that follow the hotword 130. In other words, referring to a "hotword" refers to a word or phrase that is a designated hotword or sounds similar to at least a portion of the designated hotword (e.g., sounds similar to a hotword in other languages).

To detect the presence of hotwords 130 within the utterance 150, each user device 110 includes a hotword detector 200. The hotword detector 200 may receive sounds corresponding to the utterance 150 and determine whether the utterance 150 includes a term that has been designated or assigned as a hotword 130. In some examples, the hotword detector 200 detects acoustic features of captured sound from the utterance 150. Here, when the acoustic features are characteristic of the hotword 130, the hotword detector 200 identifies the hotword 130. With the detection of a hotword 130, the hotword detector 200 may initiate the wake-up process and further processes for the user device 110. In other configurations, the hotword detector 200 communicates the detection of the hotword 130 to other components of the user device 110. In some implementations in order to efficiently and to effectively detect hotwords 130, the hotword detector 200 is trained by a hotword detector model 220 with data or examples of speech to learn how to identify whether an utterance 150 includes a hotword 130. For example, the hotword detector 200 is taught by a machine learning model to identify a hotword 130.

In some examples, a user 10 or the user device 110 generates a hotword query 132 to identify hotwords 130 of interest to the user 10 and/or the user devices 110. In some implementations, a user device 110 communicates with the remote server 140 via the network 120 to identify and/or to receive hotwords 130 from a hotword repository 142 in communication with the remote server 140. In some examples, the hotword query 132 may include a user identifier that maps to all hotwords 130 assigned to user devices 110 owned by a user 10 associated with the user identifier. Additionally or alternatively, a user device 110 may obtain an identifier (e.g., media access control (MAC) identifier) associated with each nearby user device 110 and provide the identifier in the query 132 to obtain all hotwords 130 associated with each identifier from the repository 142. The hotword repository 142 may include any combination of hotwords 130 assigned to nearby devices 110, a list of hotwords 130 associated with one or more devices 110 owned and/or controlled by a specific user 10, and/or a list of all potential hotwords 130 that may be assigned to any given device 110 for initiating the wake-up process (e.g., global hotwords associated with a particular type(s) of device(s) 110). By generating a hotword may receive hotword(s) 130 to form a robust hotword training process for the hotword detector 200. Referring to FIG. 1, each user device 110 is configured to send and/or to receive hotword queries 132 to one or more other user devices 110 to understand and/or to compile hotword(s) 130 that are assigned to the other user devices 110.

Each user device 110 may be further configured as a speech synthesis device. As a speech synthesis device, a user device 110 may further include a speech synthesizer 300, such as a text-to-speech (TTS) system, that generates synthesized speech 160. For instance, the synthesized speech 160 may audibly convey an answer to a query received from the user 10. In some examples, all functionality of the speech synthesizer 300 may reside on the user device 110. In other examples, a portion of the speech synthesizer 300 resides on the user device 110 and the remaining portion of the speech synthesizer 300 resides on a distributed environment, e.g., cloud computing environment 140.

In some examples, the speech synthesizer 300 on one device 110 (e.g., the first user device 110, 110a) is trained on a text-to-speech sequence or audio representation of a hotword 130 assigned to the other user device 110 (e.g., the second user device 110b). For instance, a training pipeline (e.g., a hotword-aware trainer 310) of the speech synthesizer 300 (e.g., a TTS system) associated with one device 110 may generate a hotword-aware model 320 for use in detecting a presence of hotwords 130. The hotword-aware model 320 may be trained on any combination of hotwords 130 assigned to nearby devices 110, a list of hotwords 130 associated with one or more devices 110 owned and/or controlled by a specific user 10, and/or a list of all potential hotwords 130 that may be assigned to any given device 110 for initiating the wake-up process (e.g., global hotwords associated with a particular type(s) of device(s) 110). Additionally or alternatively, the hotword query 132 may be used to obtain the hotword(s) 130 for the hotword-aware model 320. The speech synthesizer 300 of each user device 110 may further include a waveform generator 312 for producing synthesized speech 160. The waveform generator 312 may use unit selection logic for generating synthesized speech 160 in the form of output audio data. In some examples, the waveform generator 312 uses a neural network for generating the output audio data. While examples are directed toward using the hotword-aware model 320 for detecting a presence of hotwords 130 in synthesized speech, the hotword-aware model 320 may be similarly trained for detecting hotwords 320 in other types of specified audio, such as, without limitation, broadcast audio.

In the example shown, the speech-enabled system 100 includes a first user device 110a and a second user device 110b. The second user device 110b may be considered a nearby device of the first user device 110a or vice versa. Here, the user devices 110a, 110b are considered "nearby" of one another when the corresponding audio capture device 116 on one device 102 is capable of capturing an utterance 150 directed to the other device 102. Stated differently, "nearby" user devices 110a, 110b are within overlapping audio receiving proximity such that the speech output device 118 of one user device 110, 110a is within detectable range of the audio capturing device 116 of a nearby user device 110, 110b. Although the speech-enabled system 100 is shown to include two user devices 110a, 110b, in other examples, the speech-enabled system 100 includes additional user devices 110 without departing from the scope of the present disclosure. Some examples of user devices 110 are portable computers, smartphones, tablet-computing devices, smart speakers, smart displays, or wearable computing devices.

In some examples, the user devices 110, 110a-b each correspond to a user 10 speaking words or sub-words, over one or more networks 120. For instance, the user 10 may say a first utterance 150a detectable by the first user device 110a that includes "Ok Google: Remind me first thing tomorrow morning to Restart Computer at Work." Here, the phrase "Ok Google" is a hotword 130 assigned to the user device 110a to thereby cause the hotword detector 200 to trigger the user device 110a to initiate a wake-up process for processing the hotword 130 and/or one or more other terms following the hotword 130 in the audio input data (e.g., the remainder of the first utterance 150a, "Remind me first thing tomorrow to Restart Computer at Work"). In this example, the first user device 110a responds to the first utterance 150a with synthesized speech 160 saying, "Ok, Jim. Reminder is set for tomorrow morning."

Similarly, the second user device 110, 110b may be assigned the hotword 130 "Start Computer." In this configuration, the user 10 desires the second user device 110, 110b to initiate a wake-up process when the user 10 uses the hotword 130, "Start Computer." Accordingly, when the user 10 says a second utterance 150b detectable by the second user device 110b that includes "Start Computer: Play music from 70's music playlist," the phrase "Start computer" causes the hotword detector 200 to trigger the second user device 110b to initiate a wake-up process for processing the hotword 130 and/or one or more other terms following the hotword 130 in the audio input data "Play music from 70's music playlist."

When two user devices 110 are nearby, synthesized speech 160 including a hotword 130 as output data from the first user device 110a may be inadvertently received by the audio capturing device 116, 116b of the second user device 110b. In response to the inadvertently received synthesized speech 160 containing the hotword 130, the user 10 does not intend for the hotword detector 200, 200b of the second device 110, 110b to wake-up and/or initiate further processing based on the inadvertently received synthesized speech 160. To prevent a hotword detector 200 from activating the second user device 110, 110b, the hotword detector 200 may be configured to identify synthesized speech 160 and ignore synthesized speech 160 containing the hotword 130.

Figure 2:
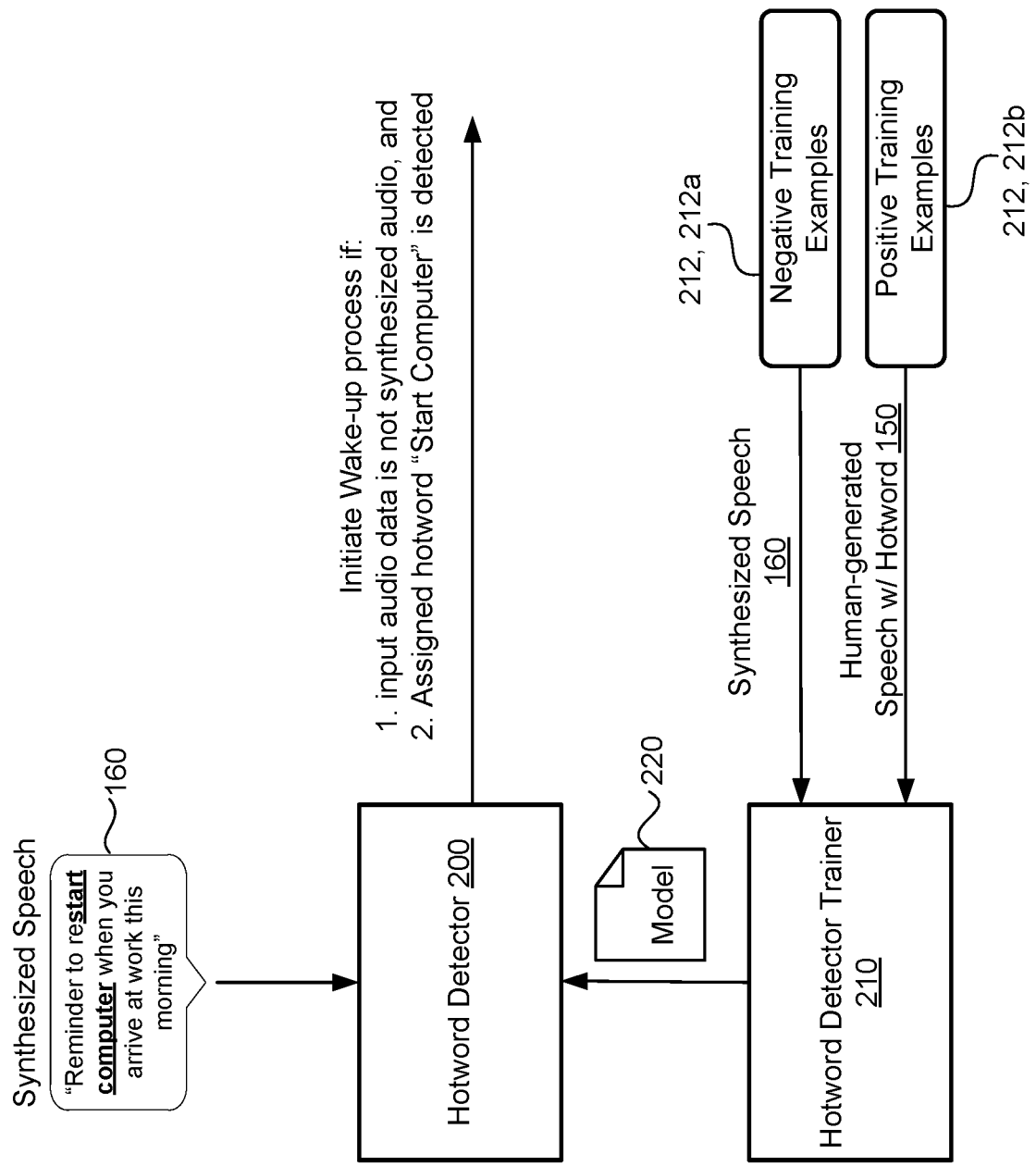
FIG. 2 is a schematic view of an example hotword detector from a speech-enabled environment.

FIG. 2 is an example of the hotword detector 200 within a user device 110 of the speech-enabled system 100. The hotword detector 200 is configured to determine whether audio input data, such as an utterance 150, includes a hotword 130 (e.g., based on detecting that some or all of the acoustic features of a sound corresponding to the hotword 130 are similar to acoustic features characteristic of a hotword 130). For example, the hotword detector 200 determines the utterance 150 begins with a hotword 130 and subsequently initiates a wake-up process for the user device 110 of the hotword detector 200.

In some examples, the hotword detector 200 includes a hotword detector trainer 210 and a hotword detector model 220. In addition to being trained on positive training samples 212, 212b containing audio representations of hotwords, the hotword detector trainer 210 is trained on negative training examples 212, 212a of synthesized speech 160 to generate the hotword detector model 220, and thereby teach the hotword detector 200 to discern between human-generated utterances 150 (e.g., non-synthesized speech) and synthesized utterances 160 (generated by a speech synthesizer 300). The hotword detector model 220 is a synthesized speech aware model 220 generated by the hotword detector trainer 210 based on training examples 212, 212a-b.

In some implementations, the hotword detector trainer 210 trains the hotword detector model 220 by negative training examples 212a and positive training examples 212b. A negative training example 212a is a sample of audio that the hotword detector trainer 210 teaches the hotword detector model 220 to ignore. Here, in order to prevent inadvertent wake-up initiation for a user device 110 based on synthesized speech 160, the negative training examples 212a are samples of audio corresponding to synthesized speech 160. The synthesized speech 160 of one or more negative training example(s) 212a may be synthesized speech 160 that includes the hotword 130 (i.e. pronounces the hotword 130) or synthesized speech that does not include the hotword 130. In either scenario, the hotword detector 200 is taught to disregard synthesized speech 160 so that a wake-up process based on utterances 150 is not inadvertently initiated by synthesized speech 160 containing a hotword or one or more words/sub-words that sound like the hotword 130. By disregarding synthesized speech 160, the hotword detector 200 prevents the initiation of the wake-up process on the user device 110 for processing the hotword 130 and/or the one or more other terms following the hotword 130 in the audio input data.

Optionally, the hotword detector trainer 210 may additionally or alternatively train the hotword detector model 220 by negative training examples 212a that include samples of other types of audio (e.g., broadcast audio). Accordingly, the hotword detector 200 may be similarly taught to disregard these other types of audio so that a wake-up process based on utterances 150 is not inadvertently initiated by these other types of audio containing a hotword or one or more words/sub-words that sound like the hotword 130.

In contrast, a positive training example 212b is an audio sample of an utterance 150 of human speech that includes a hotword 130. The hotword detector trainer 210 feeds the hotword detector model 220 positive training examples 212b to teach the hotword detector 200 examples where the hotword detector 200 should initiate the wake-up process. Additionally or alternatively, the hotword detector trainer 210 may train the hotword detector model 220 with training examples 212 that are audio samples of utterances 150 of human speech without the hotword 130 in order to expose the hotword detector 200 to further scenarios that may occur during operation of the hotword detector 200. In some implementations, the more training examples 212 taught to the hotword detector model 220 by the hotword detector trainer 210, the more robust and/or computationally efficient the hotword detector 200 becomes when implementing the hotword detector model 220. Moreover, by training the hotword detector 200 with the hotword detector model 220 taught by training examples 212 from the hotword detector trainer 210, the hotword detector model 220 allows detection of the presence of synthesized speech in utterances 150 (e.g., audio input data) through an analysis of acoustic features of the utterances 150 without transcribing or semantically interpreting the utterances 150.

With continued reference to FIG. 2, the hotword detector 200 of the user device 110 implements the hotword detector model 220 to determine whether the received audio input data of "reminder to restart computer when you arrive at work this morning" includes a hotword 130. For example, the first user device 110, 110a generates this audio input data as synthesized speech 160. The second user device 110, 110b, as a nearby user device to the first user device 110, 110a may overhear this synthesized speech 160, for example, at an audio capture device 116, 116b of the second user device 110, 110b. Here, instead of the hotword detector 200, 200b initiating the wake-up process due to the hotword 130, "start computer" as an acoustic feature of the synthesized speech 160, the hotword detector 200, 200b implements the hotword detector model 220 to identify the audio input data as synthesized speech 160 and thereby ignores the presence of the assigned hotword 130 "start computer" contained within the phrase "reminder to restart computer when you arrive at work this morning."

In some configurations, the hotword detector trainer 210 is configured to segregate training examples 212 into training and evaluation sets (e.g., 90% training and 10% evaluation). With these sets, the hotword detector trainer 210 trains the hotword detector model 220 with the audio samples until a performance of the hotword detector model 220 on the evaluation set stops decreasing. Once the performance stops decreasing on the evaluation set, the hotword detector model 220 is ready for modeling where the hotword detector model 220 allows the hotword detector 200 to accurately detect hotwords 130 received at the user device 110 that do not correspond to synthesized speech 160.

Additionally or alternatively, the hotword detector model 220 is a neural network. The hotword detector model 220 may be a convolution neural network (CNN) or a deep neural network (DNN). In some examples, the hotword detector model 220 is a combination of a convolution neural network and a deep neural network such that the convolution neural network filters, pools, then flattens information to send to a deep neural network. Much like when the hotword detector model 220 is a machine learning model, a neural network is trained (e.g., by the hotword detector trainer 210) to generate meaningful outputs that may be used for accurate hotword detection. In some examples, a mean squared error loss function trains the hotword detector model 220 when the hotword detector model 220 is a neural network.

Figure 3A:
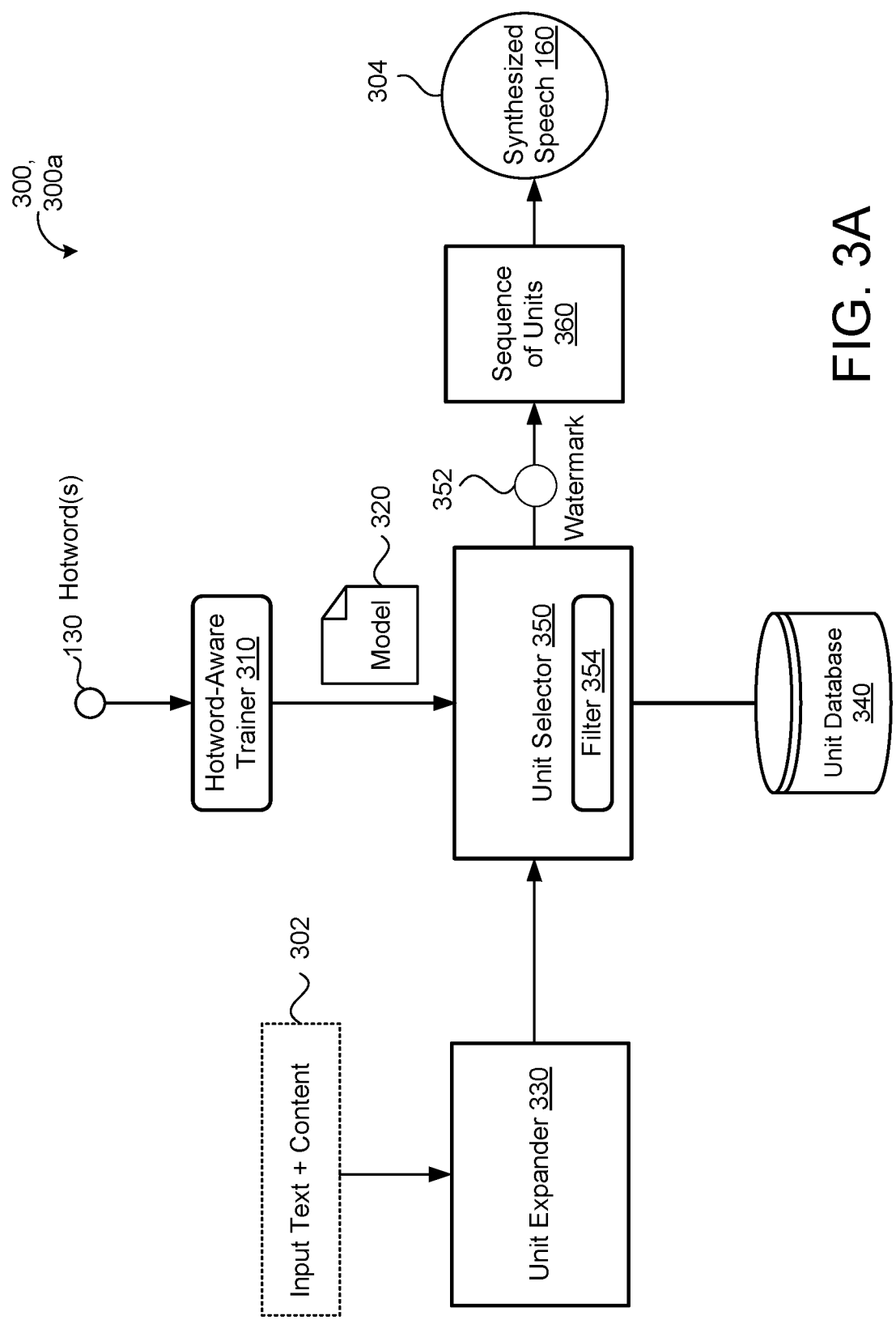
FIGS. 3A and 3B are schematic views of example synthesized speech systems incorporating a hotword-aware trainer.
Figure 3B:
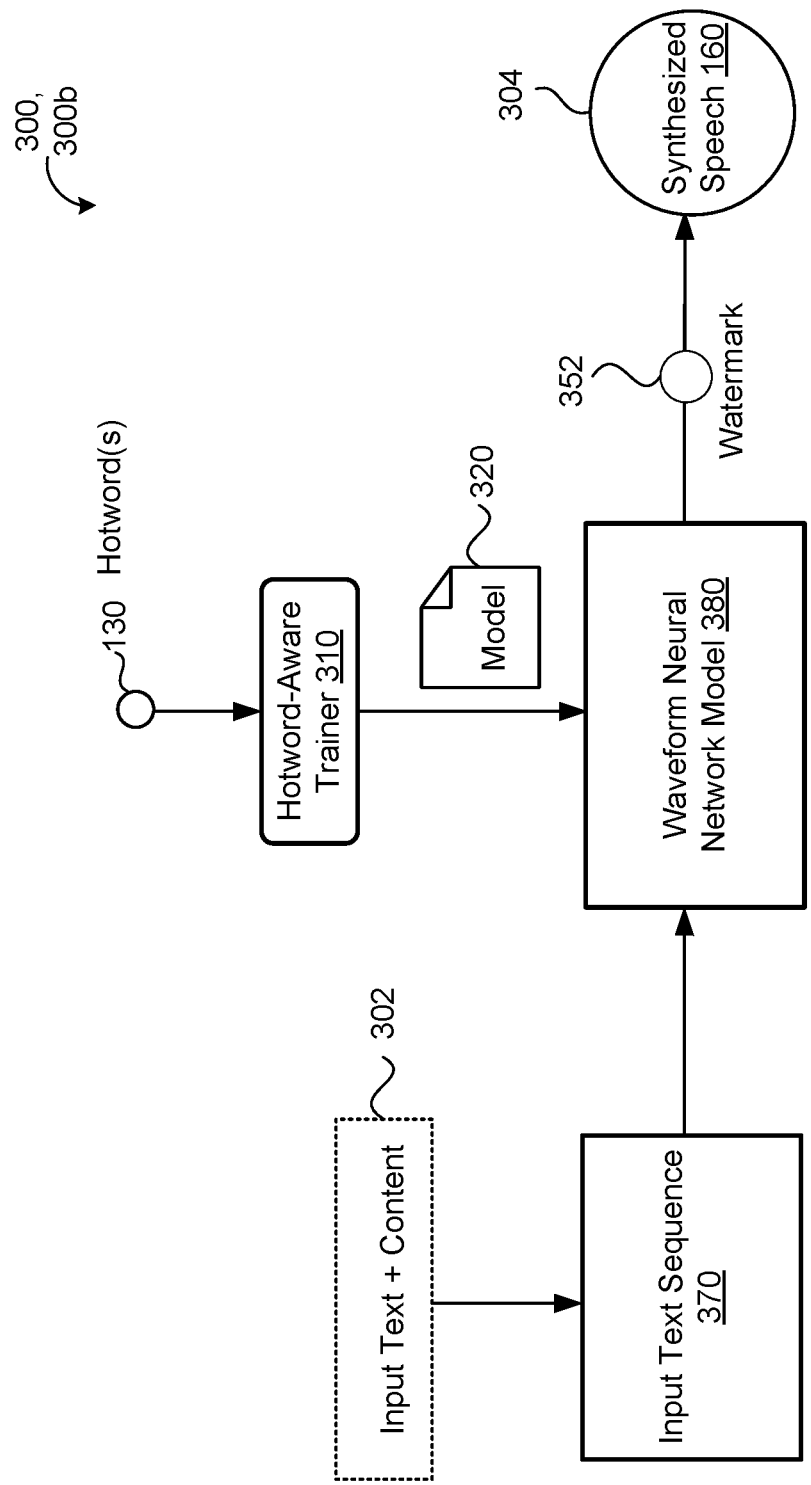

FIGS. 3A and 3B are examples of the speech synthesizer 300 of a user device 110. As an example, the speech synthesizer 300 is a TTS system where an input to the speech synthesizer is text input data 302. The speech synthesizer 300 may be configured to generate synthesized speech 160 from the text input data 302 by converting the text input data 302 into synthesized speech 160. As illustrated by FIGS. 3A and 3B, the speech synthesizer 300 can generate synthesized speech 160 by different processes, such as a unit selection process (FIG. 3A) or a neural network process (FIG. 3B). In either process, the speech synthesizer 300 includes a hotword-aware trainer 310 along with a hotword-aware model 320 to provide an audio output signal 304 identifiable by nearby user device(s) 110 to prevent an initiation of the wake-up process on the nearby user device 110. In other words, although the audio output signal 304 may include a hotword 130 that should initiate the wake-up process for a nearby user device 110, the speech synthesizer 300 identifies the audio output signal 304 as synthesized speech 160 to avoid/evade initiating wake-up processes associated with other nearby user devices 110. In these examples, the speech synthesizer 300 uses the hotword-aware model 320 to detect a presence of a hotword 130 assigned to a user device 110 and to determine whether a pronunciation (e.g., the audio output signal 304 of synthesized speech 160) of the text input data 302 includes the hotword 130. When the pronunciation includes the hotword 130, the speech synthesizer 300 generates the audio output signal 304 such that the pronunciation fails to trigger hotword detector(s) 200 from a different user device 110.

In some examples, the hotword-aware trainer 310 utilizes the hotword query 132 to obtain a hotword 130 or a list of hotwords 130 (e.g., from a hotword repository 142 or directly from nearby user devices 110). As stated previously, the hotword query 132 may obtain any combination of hotwords 130 assigned to nearby devices 110, a list of hotwords 130 associated with one or more devices 110, 110a-n owner-controlled by a specific user 10, and/or a list of all potential hotwords 130 that may be assigned to any given device 110 for initiating the wake-up process. In other examples, the user 10 or an administrator of the user devices 110 of the speech-enabled system 100 preprograms and/or updates the hotword-aware trainer 310 with hotword(s) 130. The hotword-aware trainer 310 trains the hotword-aware model 320 based on received and/or obtained hotwords 130. In some examples, the hotword-aware trainer 310 trains the hotword-aware model 320 based on a TTS sequence or an audio representation of at least one hotword 130.

The speech synthesizer 300 may use the hotword-aware model 320 at any point during the speech synthesis process. In some examples, the speech synthesizer 300 first generates a text-to-speech output and then uses the hotword-aware model 320 to analyze the synthesized speech 160 for a hotword 130 or sound-alike phrases. In other examples, the speech synthesizer 300 uses the hotword-aware model 320 to analyze the text-to-speech output for a hotword 130 during the generation of the synthesized speech 160.

When the hotword-aware model 320 identifies a hotword 130 during the speech synthesis process or within the synthesized speech 160, the speech synthesizer 300 provides an indication that the synthesized speech 160 includes a hotword 130 (e.g., within the audio output signal 304). In some examples, the speech synthesizer 300 emits a known watermark 352 over the audio sequence of the synthesized speech 160 that is identifiable to a hotword detector 200. The speech synthesizer 300 may insert the watermark 352 into or over the synthesized speech 160 in any manner that is identifiable to the hotword detector 200. For instance, the speech synthesizer 300 may insert a watermark by appending/prepending/overlaying the watermark or encoding the watermark within the synthesized speech 160. The speech synthesizer 300 may insert a unique feature, such as the known watermark 352, over the audio sequence in discrete intervals within the synthesized speech 160. These discrete intervals may range anywhere from millisecond intervals to larger intervals spanning several seconds. For example, smaller intervals, such as millisecond intervals, allow even portions of the synthesized speech 160 received at a nearby user device 110 to be identifiable to prevent unwanted wake-up initiation. Inserting watermarks 352 at intervals may further prevent unwanted speech recognition in the event that the user device is active and already awake. In some implementations, the speech synthesizer 300 distorts the synthesized speech 160 using a filter 354 that has been trained against a given hotword detector 200. In other words, the hotword detector 200 on the nearby device 110 is trained with the filter 354 to ignore filtered synthesized speech 160. In some examples, the filter 354 obscures the hotword 130 within synthesized speech 160 to a hotword detector 200. Similarly, the speech synthesizer 300 may alter a speech waveform corresponding to an audio output signal 304 associated with the synthesized speech 160 by removing or altering any sounds associated with a hotword 130 in order to evade hotword detection by a hotword detector 200.

Referring to FIG. 3A, the speech synthesizer 300, 300a uses unit selection logic to generate the synthesized speech 160. Here, the speech synthesizer 300 is a TTS system where a unit expander 330 receives the text input data 302 and parses the text input data 302 into components compatible with speech units of a unit database 340. A unit selector 350 is configured to interpret the parsed text input data from the unit expander 330 and to select speech units that correspond to the parsed text input data from the unit database 340 in communication with the unit selector 350. The unit database 340 is a database that generally includes a collection of units of parsed text along with these units' corresponding audio signal form (i.e. speech units). The unit selector 350 constructs a sequence of units 360 from speech units relating to the parsed text input data to form the synthesized speech 160 for the text input data 302. In some configurations, when the synthesized speech 160 includes a hotword 130, the speech synthesizer 300, 300a is configured to select alternative variations of the speech units to form the synthesized speech 160 such that a hotword detector 200 would fail to detect the hotword 130.

FIG. 3B is an example of a speech synthesizer 300, 300b similar to that of FIG. 3A, except that the speech synthesizer 300, 300b receives text input data 302 and generates an input text sequence 370 to be input into a waveform neural network model 380. The waveform neural network model 380, unlike the unit selection process, does not require a unit database 340. Without the unit database 340, the waveform neural network model 380 may achieve greater computational efficiency and reduce a portion of the computational load when compared to the speech synthesizer 300, 300a.

Similar to the hotword detector model 220, the hotword-aware model 320 and/or waveform neural network model 380 may be machine learning models that may first undergo model training (e.g., in the case of the hotword-aware model 320 via the hotword-aware trainer 310) and, once trained, may proceed to be implemented by the speech synthesizer 300. During model training, models 320, 380 receive data sets and result sets to predict its own output based on input data similar to the data sets. In the case of the hotword-aware model 320, the data sets and results sets may be audio samples or text samples associated with the hotword 130, such as a phrase, a word, a sub-word, a text-to-speech sequence, a linguistic variation, a language translation, etc. In the case of the waveform neural network model 380, the data sets and results sets may be text samples configured to train the waveform neural network model 380 to generate synthesized speech 160 from the input text sequence 370. In some examples, for training purposes, data is segregated into training and evaluation sets (e.g., 90% training and 10% evaluation). With these sets, the models 320, 380 train until a performance on the evaluation set stops decreasing. Once the performance stops decreasing on the evaluation set, each respective model 320, 380 is ready for modeling (e.g., identifying hotwords 130 for the hotword-aware model 320 or generating synthesized speech 160 for the waveform neural network model 380).

Additionally or alternatively, each respective model 320, 380 is a neural network. The model 320, 380 may be a convolution neural network (CNN) (e.g., a modified Wave-Net) or a deep neural network (DNN). In some examples, the model 320, 380 is a combination of a convolution neural network and a deep neural network such that the convolution neural network filters, pools, then flattens information to send to a deep neural network. Much like when the model 320, 380 is a machine learning model, a neural network is trained to generate meaningful audio output signals 304. In some examples, a mean squared error loss function trains the model 320, 380 when the model 320, 380 is a neural network.

Figure 4:
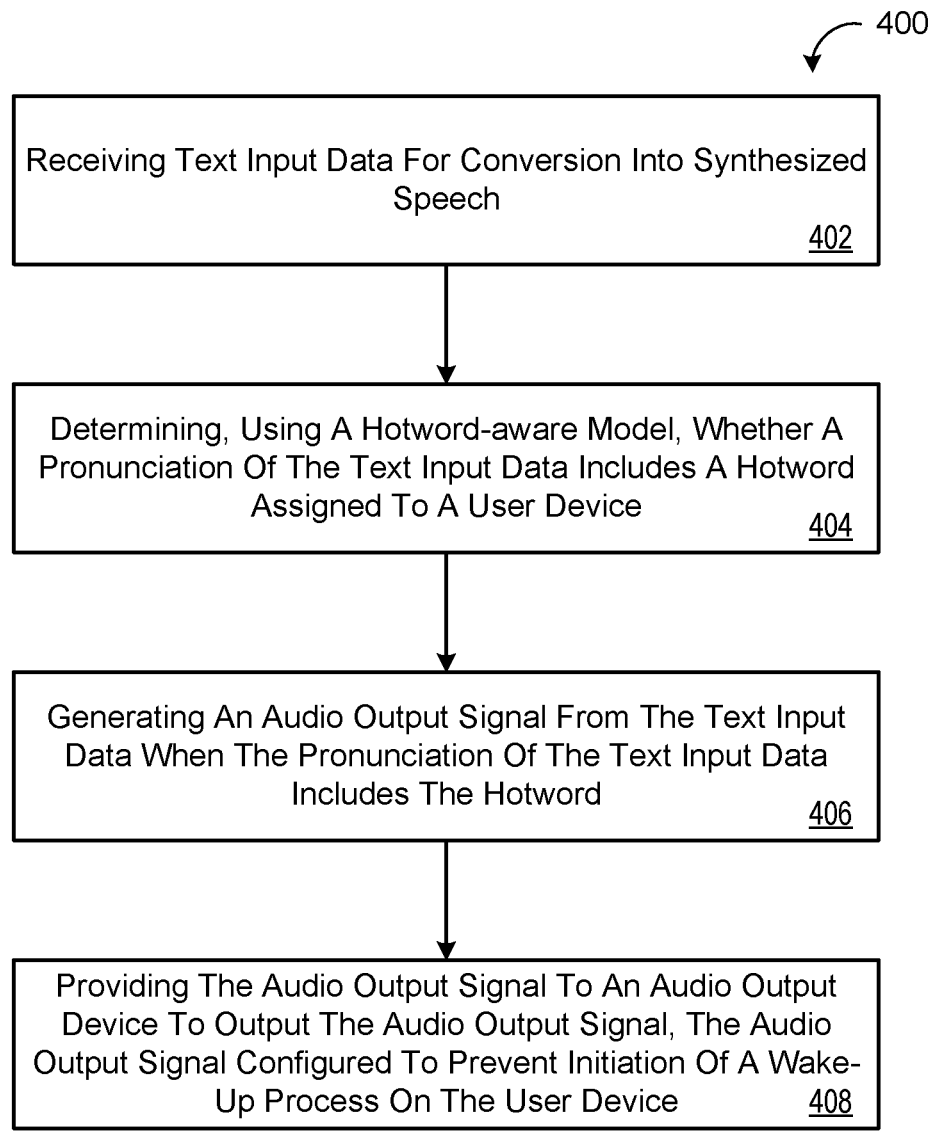
FIG. 4 is a flowchart of an example arrangement of operations for a method of detecting a presence of a hotword in text input data for conversion into synthesized speech at a speech synthesis device.

FIG. 4 is a flowchart of an example arrangement of operations for a method 400 of determining a pronunciation of text input data 302 includes a hotword 130 assigned to a nearby device 110. The data processing hardware 112 may execute the operations for the method 400 by executing instructions stored on the memory hardware 114. At operation 402, the method 400 includes receiving, at the data processing hardware 112 of a speech synthesis device 300, text input data 302 for conversion into synthesized speech 160. At operation 404, the method 400 includes determining, by the data processing hardware 112 and using a hotword-aware model 320 trained to detect a presence of a hotword 130 assigned to a user device 110, whether a pronunciation of the text input data 302 includes the hotword 130, the hotword 130, when included in audio input data received by the user device 110, configured to initiate a wake-up process on the user device 110 for processing the hotword 130 and/or one or more other terms following the hotword 130 in the audio input data.

At operation 406, when the pronunciation of the text input data 302 includes the hotword 130, the method 400 includes generating an audio output signal 304 from the input text data 302. At operation 408, when the pronunciation of the text input data 302 includes the hotword 130, the method 400 includes providing, by the data processing hardware 112, the audio output signal 304 to an audio output device 118 to output the audio output signal 304, the audio output signal 304 when captured by an audio capture device 116 of the user device 110, configured to prevent initiation of the wake-up process on the user device 110.

Figure 5:
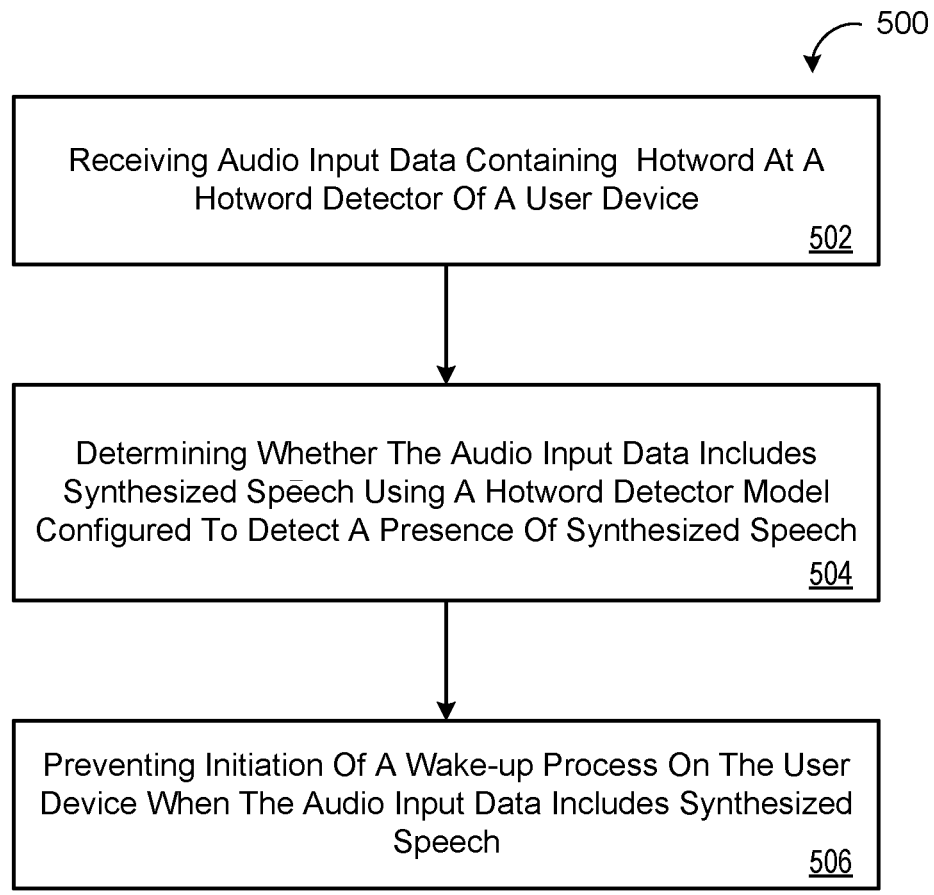
FIG. 5 is a flowchart of an example arrangement of operations for a method of preventing initiation of a wake-up process on a user device when audio input data includes synthesized speech.

FIG. 5 is a flowchart of an example arrangement of operations for a method 500 when the audio input data includes synthesized speech 160, preventing initiation of a wake-up process on a user device 110 for processing audio input data when the audio input data includes synthesized speech 160. The data processing hardware 112 may execute the operations for the method 500 by executing instructions stored on the memory hardware 114. At operation 502, the method 500 includes receiving, at a hotword detector 200 of the user device 110, audio input data containing a hotword 130. The hotword 130 is configured to initiate the wake-up process on the user device 110 for processing the hotword 130 and/or one or more other terms following the hotword 130 in the audio input data. At operation 504, the method 500 includes determining, by the hotword detector 200, whether the audio input data includes synthesized speech 160 using a hotword detector model 220 configured to detect the hotword 130 in the audio input data and a presence of synthesized speech 160. At operation 506, when the audio input data includes synthesized speech 160, the method 500 includes preventing, by the hotword detector 200, initiation of the wake-up process on the user device 110 for processing the hotword 130 and/or the one or more other terms following the hotword 130 in the audio input data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
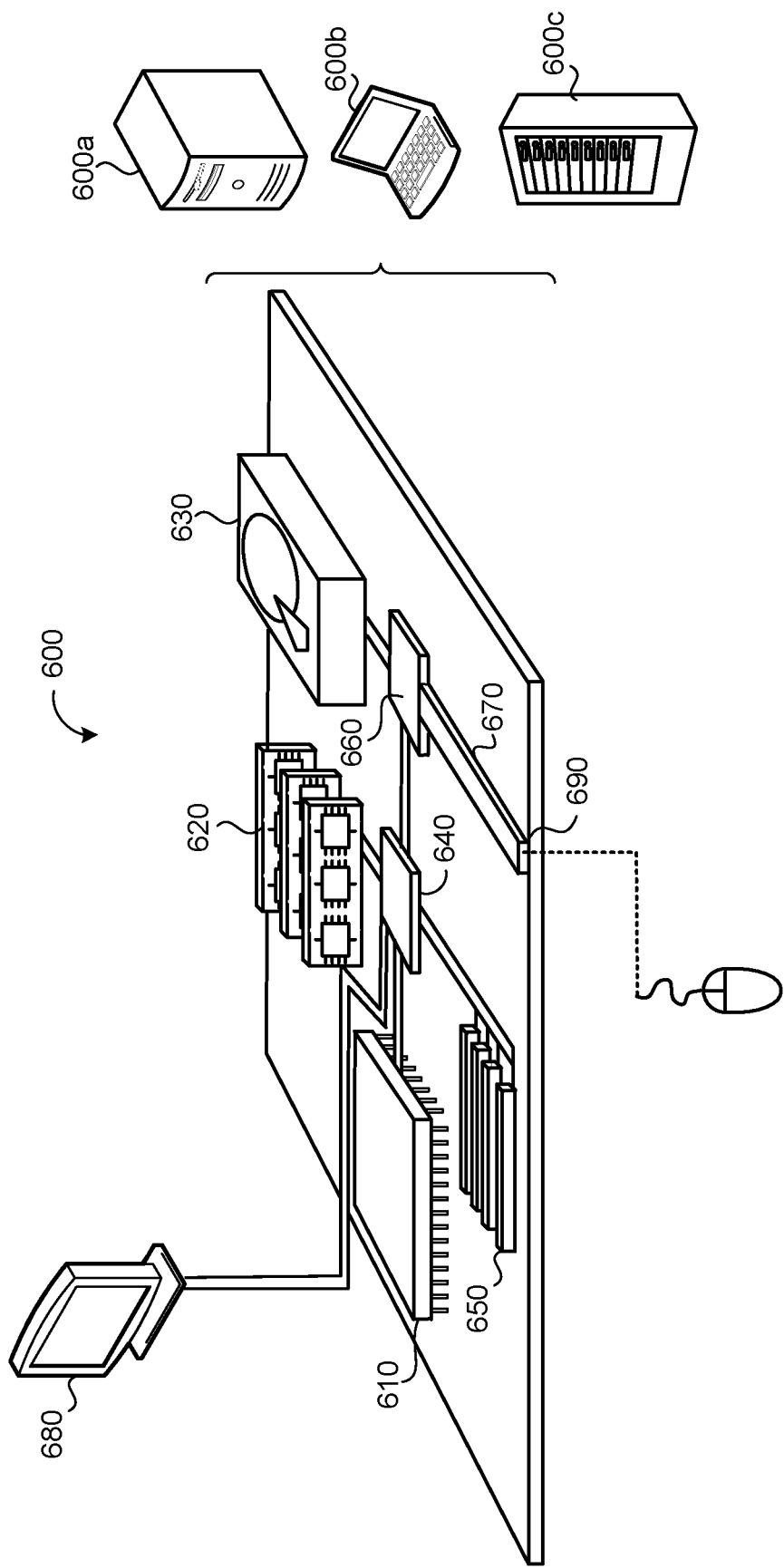
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a speech synthesis device, text input data for conversion into text-to-speech (TTS) audio;
determining, by the data processing hardware and using a hotword-aware model trained to detect a presence of at least one hotword assigned to a user device, whether a pronunciation of the text input data prior to conversion into the TTS audio includes the hotword, the hotword, when included in audio input data received by the user device, configured to initiate a wake-up process on the user device for processing the hotword and/or one or more other terms following the hotword in the audio input data; and
when the pronunciation of the text input data prior to conversion into the TTS audio includes the hotword:
generating, by the data processing hardware, an audio output signal that includes the TTS audio converted from the text input data; and
providing, by the data processing hardware, the audio output signal to an audio output device to output the audio output signal, the audio output signal when captured by an audio capture device of the user device, configured to prevent initiation of the wake-up process on the user device.

2. The method of claim 1, wherein determining whether the pronunciation of the text input data prior to conversion into the TTS audio includes the hotword comprises determining that of at least one of a word, a sub-word, or a text-to-speech sequence of the text input data is associated with the hotword.

3. The method of claim 1, wherein the hotword-aware model is trained on a text-to-speech sequence or audio representation of the hotword assigned to the user device.

4. The method of claim 1, wherein the text input data comprises a first language and the audio output signal comprises a translation of the text input data in a different language.

5. The method of claim 1, further comprising:
detecting, by the data processing hardware, a presence of the user device within an operating environment of the speech synthesis device; and
querying, by the data processing hardware, the user device to obtain the hotword assigned to the user device for training the hotword-aware model.

6. The method of claim 1, further comprising querying, by the data processing hardware, a remote hotword repository to obtain at least the hotword assigned to the user device for training the hotword-aware model.

7. The method of claim 1, wherein generating the audio output signal that includes the TTS audio converted from the text input data comprises inserting a watermark to the audio output signal that indicates the audio output signal corresponds to the TTS audio and instructs a hotword detector of the user device to ignore detection of the hotword in the synthesized speech.

8. The method of claim 1, wherein generating the audio output signal that includes the TTS audio converted from the text input data comprises:
determining a speech waveform that represents the TTS audio converted from the text input data; and
altering the speech waveform by removing or altering any sounds associated with the hotword to evade detection of the hotword by a hotword detector of the user device.

9. The method of claim 1, wherein generating the audio output signal that includes the TTS audio converted from the text input data comprises:
determining a speech waveform that represents the text input data; and
filtering the speech waveform to evade detection of the hotword by a hotword detector of the user device.

10. A system comprising:
data processing hardware of a speech synthesis device; and
memory hardware in communication with the data processing hardware, the memory hardware storing instructions that when executed by the data processing hardware cause the data processing hardware to perform operations comprising:
receiving text input data for conversion into text-to-speech (TTS) audio;
determining, using a hotword-aware model trained to detect a presence of at least one hotword assigned to a user device, whether a pronunciation of the text input data prior to conversion into the TTS audio includes the hotword, the hotword, when included in audio input data received by the user device, configured to initiate the wake-up process on the user device for processing the hotword and/or one or more other terms following the hotword in the audio input data; and
when the pronunciation of the text input data prior to conversion into the TTS audio includes the hotword:
generating an audio output signal that includes the TTS audio converted from the text input data; and
providing the audio output signal to an audio output device to output the audio output signal, the audio output signal when captured by an audio capture device of the user device, configured to prevent initiation of the wake-up process on the user device.

11. The system of claim 10, wherein determining whether the pronunciation of the text input data prior to conversion into the TTS audio includes the hotword comprises determining that of at least one of a word, a sub-word, or a text-to-speech sequence of the text input data is associated with the hotword.

12. The system of claim 10, wherein the hotword-aware model is trained on a text-to-speech sequence or audio representation of the hotword assigned to the user device.

13. The system of claim 10, wherein the text input data comprises a first language and the audio output signal comprises a translation of the text input data in a different language.

14. The system of claim 10, wherein the operations further comprise:
detecting a presence of the user device within an operating environment of the speech synthesis device; and
querying the user device to obtain the hotword assigned to the user device for training the hotword-aware model.

15. The system of claim 10, wherein the operations further comprise querying a remote hotword repository to obtain at least the hotword assigned to the user device for training the hotword-aware model.

16. The system of claim 10, wherein generating the audio output signal that includes the TTS audio converted from the text input data comprises inserting a watermark to the audio output signal that indicates the audio output signal corresponds to the TTS audio and instructs a hotword detector of the user device to ignore detection of the hotword in the synthesized speech.

17. The system of claim 10, wherein generating the audio output signal that includes the TTS audio converted from the text input data comprises:
- determining a speech waveform that represents the TTS audio converted from the text input data; and
- altering the speech waveform by removing or altering any sounds associated with the hotword to evade detection of the hotword by a hotword detector of the user device.

18. The system of claim 10, wherein generating the audio output signal that includes the TTS audio converted from the text input data comprises:
- determining a speech waveform that represents the text input data; and
- filtering the speech waveform to evade detection of the hotword by a hotword detector of the user device.

* * * * *